(12) United States Patent
Jakimov et al.

(10) Patent No.: US 10,518,325 B2
(45) Date of Patent: Dec. 31, 2019

(54) DEVICE AND METHOD FOR ADDITIVELY PRODUCING AT LEAST ONE COMPONENT REGION OF A COMPONENT

(71) Applicants: MTU Aero Engines AG, Munich (DE); EOS GmbH Electro Optical Systems, Krailling (DE)

(72) Inventors: Andreas Jakimov, Munich (DE); Georg Schlick, Munich (DE); Herbert Hanrieder, Hohenkammer (DE); Martin Leuterer, Olching (DE)

(73) Assignees: MTU Aero Engines AG, Munich (DE); EOS GmbH Electro Optical Systems, Krailling (DE)

( * ) Notice: Subject to any disclaimer, the term of this patent is extended or adjusted under 35 U.S.C. 154(b) by 892 days.

(21) Appl. No.: 14/898,936

(22) PCT Filed: Jun. 6, 2014

(86) PCT No.: PCT/EP2014/061866
§ 371 (c)(1),
(2) Date: Dec. 16, 2015

(87) PCT Pub. No.: WO2014/202413
PCT Pub. Date: Dec. 24, 2014

(65) Prior Publication Data
US 2016/0368052 A1 Dec. 22, 2016

(30) Foreign Application Priority Data
Jun. 20, 2013 (DE) .................. 10 2013 211 675

(51) Int. Cl.
*B22F 3/105* (2006.01)
*B33Y 30/00* (2015.01)
*B33Y 10/00* (2015.01)

(52) U.S. Cl.
CPC ............ *B22F 3/1055* (2013.01); *B33Y 10/00* (2014.12); *B33Y 30/00* (2014.12); *B22F 2003/1056* (2013.01)

(58) Field of Classification Search
CPC ................ B22F 3/1055; B22F 2999/00; B22F 2003/1056; B29C 64/153; B29C 64/20;
(Continued)

(56) References Cited

U.S. PATENT DOCUMENTS 5,105,872 A * 4/1992 Whiddon ................ C23C 26/02
164/80
5,224,997 A * 7/1993 Grilloud ................ C23C 26/02
118/641

(Continued)

FOREIGN PATENT DOCUMENTS

CN 102574333 A 7/2012
DE 102004041633 A1 3/2006
(Continued)

*Primary Examiner* — Thorl Chea
(74) *Attorney, Agent, or Firm* — Barlow, Josephs & Holmes, Ltd.

(57) ABSTRACT

The invention relates to a device (10) for generative production of at least one component area of a component (12), in particular of a component (12) of a flow machine. Therein, the device (10) can include at least one lowerable component platform (16) with at least one construction and joining zone (20) for receiving at least one powder layer of a component material, at least one heating device (24, 28) movable relative to the component platform (16) and at least one radiation source for generating at least one high-energy beam (22), by means of which the powder layer can be locally melted and/or sintered to a component layer in the area of the construction and joining zone (20), as well as at least one suction and/or gas supply device (36) disposed on
(Continued)

the heating device (24, 28). However, the device (10) can also include at least one coater (14).

13 Claims, 2 Drawing Sheets

(58) Field of Classification Search
CPC . B29C 2035/0811; B33Y 50/02; B33Y 10/00; B33Y 30/00; Y02P 10/295
See application file for complete search history.

(56) References Cited

U.S. PATENT DOCUMENTS

| 5,647,931 A * | 7/1997 | Retallick | B22F 3/004 |
| | | | 156/273.3 |
| 6,905,645 B2 | 6/2005 | Iskra | |

FOREIGN PATENT DOCUMENTS

| DE | 102006058949 A1 | 6/2008 |
| DE | 102009051479 A1 | 5/2011 |
| DE | 102012206122 A1 | 10/2013 |
| EP | 2359964 A1 | 8/2011 |
| EP | 2492084 A1 | 8/2012 |
| WO | 0236331 A2 | 10/2002 |
| WO | 2005025781 A1 | 3/2005 |
| WO | 2006121797 A2 | 11/2006 |
| WO | 2008071165 A1 | 6/2008 |

\* cited by examiner

DEVICE AND METHOD FOR ADDITIVELY PRODUCING AT LEAST ONE COMPONENT REGION OF A COMPONENT

BACKGROUND OF THE INVENTION

The invention relates to devices for generative production of at least one component area of a component, in particular of a component of a flow machine, according to the present invention. Furthermore, the invention relates to a method for generative production of at least one component area of a component as well as to a suction and/or gas supply device for use in a device for generative production of at least one component area of a component.

Methods and devices for producing components are known in a great plurality. In particular, generative manufacturing methods (so-called rapid manufacturing or rapid prototyping methods) are known, in which the component is constructed by powder bed based, additive manufacturing methods in layers. Predominantly metallic components can for example be produced by laser or electron beam melting or sintering methods. Therein, at least one powdery component material is first applied to a component platform in layers in the area of a construction and joining zone of the device. Subsequently, the component material is locally melted and/or sintered in layers by supplying energy by means of at least one high-energy beam, for example an electron or laser beam, to the component material in the area of the construction and joining zone. Therein, the high-energy beam is controlled depending on layer information of the component layer respectively to be produced. After melting and/or sintering, the component platform is lowered by a predefined layer thickness in layers. Thereafter, the mentioned steps are repeated up to the final completion of the component.

From the prior art, in particular, generative production methods for the production of components of a flow machine, such as for example components of an aircraft engine or a gas turbine, are also known, e.g. the method described in DE 10 2009 051 479 A1 or a corresponding device for producing a component of a flow machine.

In this method, by application of at least one powdery component material to a component platform in the area of a construction and joining zone in layers as well as locally melting or sintering the component material by means of energy supplied in the area of the construction and joining zone in layers, a corresponding component is produced. Herein, the supply of the energy is effected via laser beams such as for example CO2 laser, Nd:YAG laser, Yb fiber laser as well as diode laser or by electron beams. In the method described in DE 10 2009 051 479 A1, furthermore, the produced component or the construction and joining zone is heated to a temperature just below the melting point of the component material by means of a zone furnace to maintain a directionally solidified or monocrystalline crystal structure.

From DE 10 2006 058 949 A1, a device and a method for fast production and repair of blade tips of blades of a gas turbine, in particular of an aircraft engine, are also known, wherein inductive heating is employed together with laser or electron beam sintering.

Inductive heating of the component to be produced in association with the generative production of a component with the aid of selective laser melting is also described in EP 2 359 964 A1.

WO 2008/071165 A1 again describes a device and a method for repairing turbine blades of gas turbines by means of powder deposition welding, wherein a radiation source like a laser or an electron beam is used for deposition welding. At the same time, a heating device for heating the blade to be repaired is provided via an induction coil.

DE 10 2012 206 122 A1 describes a device for generative production of components by means of laser powder deposition welding and/or selectively irradiating a powder bed, wherein the device has at least one induction coil movably disposed relative to one or more powder bed rooms. Therein, the induction coils are linearly movable along separately formed rail assemblies. By the local inductive heating of the component individually adapted to the geometry of the component to be produced, it is possible that hot crack formations are reliably prevented in the production of the component, in particular in use of high-temperature alloys for the generative manufacture.

However, the circumstance is to be considered disadvantageous in the known devices that the removal of deposits, splashes and process exhaust gases arising during the generative production method is only insufficiently possible or with relative high instrumental expense.

BRIEF SUMMARY OF THE INVENTION

Therefore, it is the object of the present invention to provide devices of the initially mentioned kind, which allow improved removal of deposits, splashes and/or process exhaust gases arising during a generative production method with relative low instrumental expense.

According to the invention, the object is solved by a device for generative production of at least one component area of a component, by a device for generative production of at least one component area of a component, by a method as well as a suction and/or gas supply device of the present invention. Advantageous configurations with convenient developments of the invention are discussed in detail below, wherein advantageous configurations of the devices are to be regarded as advantageous configurations of the method as well as the suction and/or gas supply device and vice versa.

A first aspect of the invention relates to a device for generative production of at least one component area of a component, in particular of a component of a flow machine. Therein, the device includes at least one lowerable component platform with at least one construction and joining zone for receiving at least one powder layer of a component material, at least one heating device movable relative to the component platform and at least one radiation source for generating at least one high-energy beam, by means of which the powder layer can be locally melted and/or sintered to a component layer in the area of the construction and joining zone. In addition, the device includes at least one suction and/or gas supply device disposed on the heating device. By the arrangement of the suction and/or gas supply device on the heating device, it is possible to reliably remove deposits, splashes and/or process exhaust gases of the generative production process from the construction and joining zone before and/or during and/or after exposure by means of the radiation source or the high-energy beam in this area. In addition, devices already present for generative production of components can be readily retrofitted with a corresponding suction and/or gas supply device, which is disposed on the heating device. By the terms of "disposed" or "arrangement", it is to be understood that the suction and/or gas supply device can be directly or indirectly connected to the heating device. For example, mechanical connection to the heating device is possible. By heating the component material by means of the heating device, in addition, hot crack formations are reliably avoided, in particular in use of high-temperature alloys as the component material. Since the suction and/or gas supply device is disposed on the movable heating device, additional moving units for moving the suction and/or gas supply device into the area of the construction and joining zone of the component can be omitted. In addition, there is the possibility of supplying gas to the construction and joining zone of the component, i.e. to a working and operating area of the high-energy beam, for controlling the flow conditions in this area. However, it is also possible to supply inert gas to the construction and joining zone of the component via the gas supply device for improving the joining quality of the arising component. Furthermore, the suction and/or gas supply device can be disposed on the heating device such that a working and operating area of the high-energy beam in the area of the construction and joining zone is at least predominantly or completely in the operating area of the suction and/or gas supply device. Thereby, particularly reliable removal of deposits, splashes and/or process exhaust gases from the area of the construction and joining zone is possible.

In further advantageous configurations of the device according to the invention, the suction and/or gas supply device is movably or non-movably disposed on the heating device. The suction and/or gas supply device can be non-movably disposed on the heating device such that it is moved along or over the construction and joining zone of the component platform by the movement of the heating device. Thereby, simple constructive structure of the device overall is constituted. Furthermore, there is the possibility of movably disposing the suction and/or gas supply device on the heating device via a corresponding moving unit. Therefore, the possibility of moving the suction and/or gas supply device also opposite to the direction of movement of the heating device advantageously arises to thus increase the operating area of the suction and/or gas supply device. By the terms of "disposed" or "dispose", it is to be understood that the suction and/or gas supply device can be directly or indirectly connected to the heating device—and vice versa. For example, mechanical connection is possible.

In further advantageous configurations of the device according to the invention, it has at least one coater for applying the at least one powder layer of the component material to the construction and joining zone of the component platform, wherein the coater is movable relative to the component platform. Therein, the heating device can be non-movably disposed on the coater such that it is moved along or over the construction and joining zone of the component platform by the movement of the coater. Thereby, a simple constructive structure of the device overall is constituted. In addition, already present devices for generative production of components can be retrofitted with a corresponding heating device, which is disposed on the coater. Then, it is moved over the construction and joining zone of the component platform with the coater via a corresponding moving unit of the coater. Furthermore, the at least one heating device can be movably disposed on the coater. Therein, the coater can include at least one moving unit, on which at least one heating device in turn is disposed. Thereby, the possibility of moving the heating device also opposite to the direction of movement of the coater advantageously arises in order to thus be able to subject a further area of the construction and joining zone to heating by the heating device.

The relative movability of the heating device and/or of the coater relative to the component platform can be effected either by the movement of the heating device and/or of the coater by means of a corresponding moving unit or by moving the component platform. In the last mentioned embodiment, a separate moving unit of the heating device or of the coater can optionally be omitted.

In further advantageous configurations of the device according to the invention, the heating device is an induction coil. Therein, within the scope of the present invention, each device is understood by induction coil, which is able to generate inductive heating, thus for example independently of the number of the windings, such that the induction coil can for example also be referred to as induction loop. Therein, it is possible that the device includes multiple movable or mobile induction coils, which are disposed in one or more planes parallel to a surface of the construction and joining zone. In particular, two induction coils can be operated in arrangement crossed to each other, wherein in particular in the crossing area the high-energy beam of the radiation source can be provided for melting and/or sintering the powdery component material. In a further configuration, an induction coil can be non-movably disposed on the coater and a further induction coil can be movably disposed on the coater via a moving unit.

In further advantageous configurations of the device according to the invention, the high-energy beam is a laser or electron beam.

A second aspect of the invention relates to a device for generative production of at least one component area of a component, in particular of a component of a flow machine. Therein, the device includes at least one coater for applying at least one powder layer of a component material to at least one construction and joining zone of at least one lowerable component platform, wherein the coater is movable relative to the component platform, and at least one radiation source for generating at least one high-energy beam, by means of which the powder layer can be locally melted and/or sintered to a component layer in the area of the construction and joining zone. In addition, the device includes at least one suction and/or gas supply device disposed on the coater. By the arrangement of the suction and/or gas supply device on the movable coater, it is possible to reliably remove deposits, splashes and/or process exhaust gases of the generative production process from the construction and joining zone before and/or during and/or after exposure by means of the radiation source or the high-energy beam in this area. By the terms of "disposed" or "arrangement", it is to be understood that the suction and/or gas supply device can be directly or indirectly connected to the coater. For example, mechanical connection to the coater is possible. In addition, already present devices for generative production of components can be readily retrofitted with a corresponding suction and/or gas supply device, which is disposed on the coater. Since the suction and/or gas supply device is disposed on the movable coater, additional moving units for moving the suction and/or gas supply device into the area of the construction and joining zone of the component can be omitted. In addition, there is the possibility of supplying gas to the construction and joining zone of the component, i.e. to a working and operating area of the high-energy beam, for controlling the flow conditions in this area. However, it is also possible to supply inert gas to the construction and joining zone of the component via the gas supply device for improving the joining quality of the arising component. Furthermore, the suction and/or gas supply device can be disposed on the coater such that a working and operating area of the high-energy beam in the area of the construction and joining zone is at least predominantly or completely in the operating area of the suction and/or gas supply device.

Thereby, particularly reliable removal of deposits, splashes and/or process exhaust gases from the area of the construction and joining zone is possible.

In further advantageous configurations of the device according to the invention, the suction and/or gas supply device is movably or non-movably disposed on the coater. The suction and/or gas supply device can be non-movably disposed on the coater such that it is moved along or over the construction and joining zone of the component platform by the movement of the coater. Thereby, simple constructive structure of the device overall is constituted. Furthermore, there is the possibility of movably disposing the suction and/or gas supply device on the coater via a corresponding moving unit. Thereby, the possibility of moving the suction and/or gas supply device also opposite to the direction of movement of the coater advantageously arises in order to thus increase the operating area of the suction and/or gas supply device.

In further advantageous configurations of the device according to the invention, it has at least one heating device for heating the powder layer of the component material at least in the area of the construction and joining zone of the component platform, wherein the heating device is movable relative to the component platform. Therein, the heating device can be non-movably disposed on the coater such that it is moved along or over the construction and joining zone of the component platform by the movement of the coater. Thereby, simple constructive structure of the device overall is constituted. In addition, already present devices for generative production of components can be retrofitted with a corresponding heating device, which is disposed on the coater. Then, it is moved with the coater over the construction and joining zone of the component platform via a corresponding moving unit. Furthermore, the at least one heating device can be movably disposed on the coater. Therein, the coater can include at least one moving unit, on which at least one heating device in turn is disposed. Thereby, the possibility of moving the heating device also opposite to the direction of movement of the coater advantageously arises in order to thus be able to subject a further area of the construction and joining zone to heating by the heating device. By heating the component material by means of the heating device, in addition, hot crack formations are reliably avoided, in particular in use of high-temperature alloys as the component material.

The relative movability of the coater and/or the heating device relative to the component platform can be effected either by the movement of the coater and/or of the heating device by means of a corresponding moving unit or by moving the component platform. In the last mentioned embodiment, a separate moving unit of the heating device or of the coater can optionally be omitted.

In further advantageous configurations of the device according to the invention, the heating device is an induction coil. Therein, within the scope of the present invention, each device is understood by induction coil, which can generate inductive heating, thus for example independently of the number of the windings, such that the induction coil can for example also be referred to as induction loop. Therein, it is possible that the device includes multiple movable or mobile induction coils, which are disposed in one or more planes parallel to a surface of the construction and joining zone. In particular, two induction coils can be operated in arrangement crossed to each other, wherein in particular in the crossing area the high-energy beam of the radiation source can be provided for melting and/or sintering the powdery component material. In a further configuration, an induction coil can be non-movably disposed on the coater and a further induction coil can be movably disposed on the coater via a moving unit.

In further advantageous configurations of the device according to the invention, the high-energy beam is a laser or electron beam.

A third aspect of the invention relates to a method for generative production of at least one component area of a component, in particular of a component of a flow machine. Therein, the method according to the invention includes at least the following steps: a) applying at least one powder layer of a component material to at least one construction and joining zone of at least one lowerable component platform; b) locally melting and/or sintering the component material in layers by supplying energy by means of at least one high-energy beam in the area of the construction and joining zone for forming a component layer; c) lowering the component platform in layers by a predefined layer thickness; and d) repeating the steps a) to c) until completion of the component area. Therein, before and/or during and/or after exposure by means of the high-energy beam, in particular deposits, splashes and/or process exhaust gases of the generative production process are removed from the construction and joining zone by means of at least one suction and/or gas supply device disposed on a heating device movable relative to the component platform and/or on at least one coater movable relative to the component platform for applying the component material. Thereby, particularly reliable removal of deposits, splashes, process exhaust gases as well as other undesired gases or particles from the area of the construction and joining zone is possible.

A fourth aspect of the invention relates to a suction and/or gas supply device for use in a device for generative production of at least one component area of a component. Therein, according to the invention, the suction and/or gas supply device is formed such that it can be attached or disposed on a heating device movable relative to a component platform of the device and/or on a coater movable relative to the component platform of the device for applying the component material. By the terms of "can be disposed" or "can be attached", it is to be understood that the suction and/or gas supply device can be directly or indirectly connected to the heating device and/or the coater. For example, mechanical connection to the heating device and/or the coater is possible. The suction and/or gas supply device according to the invention allows particularly reliable removal of deposits, splashes and/or process exhaust gases from an area of a construction and joining zone in performing a generative production method.

BRIEF DESCRIPTION OF THE DRAWINGS

Further features of the invention are apparent from the claims, the embodiment of the device according to the invention described in the following as well as based on the drawings. The features and feature combinations mentioned above in the description as well as the features and feature combinations mentioned below in the embodiments are usable not only in the respectively specified combination, but also in other combinations without departing from the scope of the invention. There shows:

DETAILED DESCRIPTION OF THE INVENTION

Figure 1:
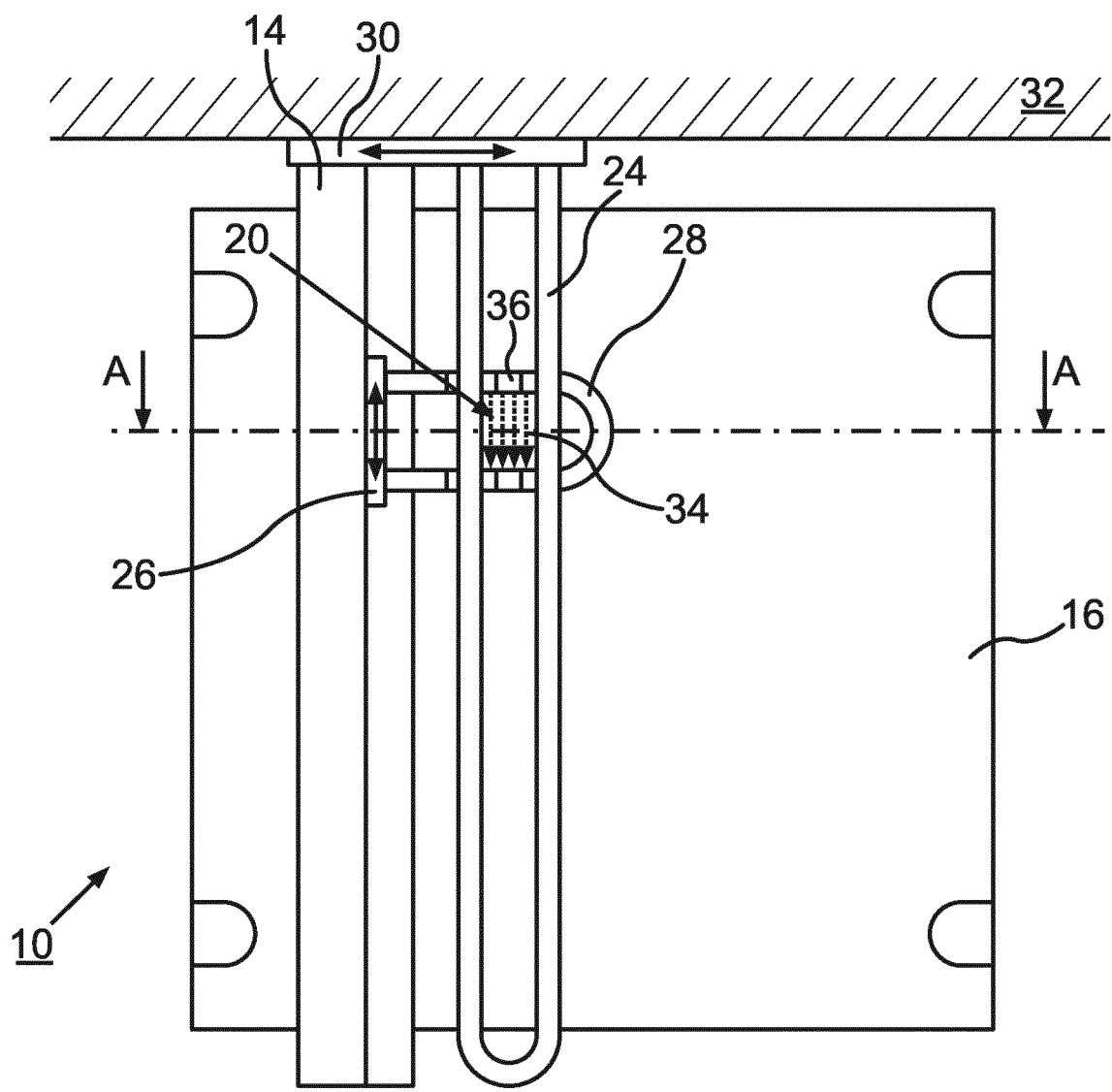
FIG. 1 a schematically illustrated plan view of a device according to the invention for producing at least one component area of a component.

FIG. 1 shows a schematically illustrated plan view of a device 10 according to the invention for generative production of at least one component area of a component, in particular of a component of a flow machine. In particular, it can be a component of a turbine or of a compressor of an aircraft engine. In addition, the device 10 has a coater 14 for applying at least one powder layer of a component material (not illustrated) to at least one construction and joining zone 20 of a lowerable component platform 16. One recognizes that the coater 14 can be moved by means of a moving unit 30, which is connected to a machine rack 32 of the device 10. Therein, the movement of the coater 14 is effected above and along the component platform 16 such that uniform application of the powdery component material to the component platform 16 in layers is possible.

Furthermore, one recognizes that a first induction coil 24 is disposed on the moving unit 30 of the coater 14. Approximately perpendicularly to the first induction coil 24, a second induction coil 28 is disposed on a moving unit 26. The moving unit 26 in turn is disposed on the coater 14 such that the second induction coil 28 can be moved along a longitudinal extension of the coater 14. In the illustrated embodiment, the two induction coils are formed in arrangement crossed to each other. One recognizes that by such an arrangement the entire area of the component platform 16 is covered by means of the induction coils 24, 28 and thus can be heated. Furthermore, it becomes clear that a high-energy beam 22, in particular a laser or electron beam, can be directed to the powder layer of the component material in the area of a construction and joining zone 20 between the induction coils 24, 28 (see FIG. 2). In particular, the high-energy beam 22 is oriented such that it can pass between a crossing area of the induction coils 24, 28.

In addition, one recognizes that by the arrangement of the induction coils 24, 28 on the coater 14, they do not have to be removed anymore from the working area of the coater 14 for coating. By heating the powder layer by means of the induction coils 24, 28 in the area of the construction and joining zone 20, it is possible to achieve consistent induction conditions on the one hand before, during and after melting the component material by means of the high-energy beam 22 and with progression of the solidification front such that consistent melting conditions with defined, local temperature gradients are adjustable with high production speeds. On the other hand, the formation of cracks and the like in solidification is avoided at the same time.

One recognizes that a suction and/or gas supply device 36 is disposed on the first induction coil 24. By the arrangement of the suction and/or gas supply device 36 on the first induction coil 24, it is possible to reliably remove in particular deposits, splashes and/or process exhaust gases of the generative production process from the construction and joining zone 20 before and/or during and/or after exposure by means of the radiation source or the high-energy beam 22. An operating area 34 of the suction and/or gas supply device 36, i.e. the area of suction and/or gas supply, in particular extends to the crossing area of the induction coils 24, 28 in the illustrated embodiment.

Figure 2:
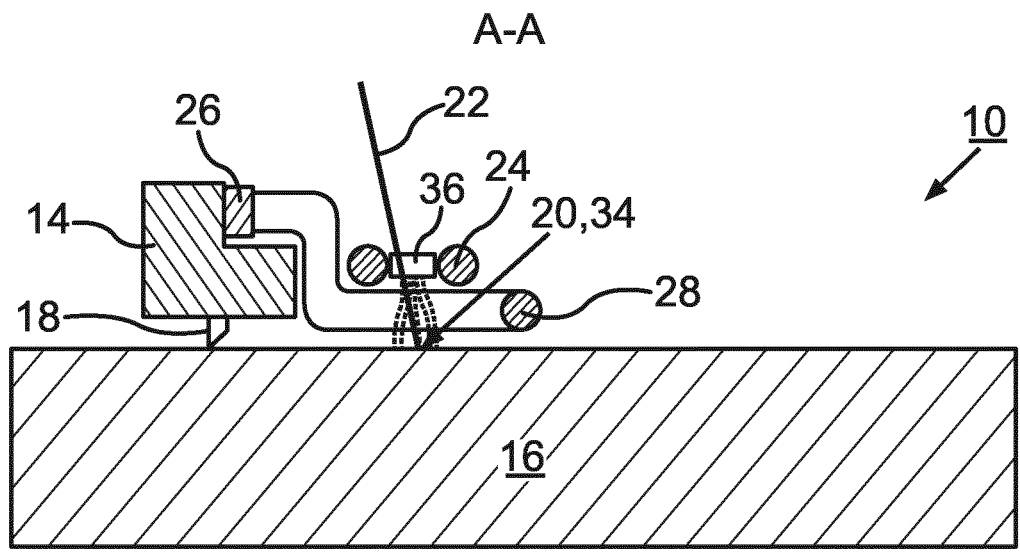
FIG. 2 a schematic sectional representation of the device according to FIG. 1.

FIG. 2 shows a schematic sectional representation of the device 10 according to the line A-A in FIG. 1. One recognizes that the second induction coil 28 disposed on the coater 14 by means of the moving unit 26 is disposed in a plane below the first induction coil 24 disposed on the moving unit 30 of the coater 14 relative to the component platform 16. The suction and/or gas supply device 36 is disposed within a winding formed by the first induction coil 24 such that its operating area 34 at least coincides with the area of the construction and joining zone 20. The high-energy beam 22 is oriented such that it can pass between the crossing area of the induction coils 24, 28.

In addition, one recognizes that the coater 14 has a blade 18 for the application of the powdery component material (not illustrated) in layers to the component platform 16. Therein, the blade 18 is movably formed such that it is at least partially retractable into the coater 14 during exposure of the powder layer in the area of the construction and joining zone 20 by means of the high-energy beam 22. Alternatively to the blade 18, other smoothing devices such as for example doctor blade, lips, combs or rollers can also be used.

Figure 3:
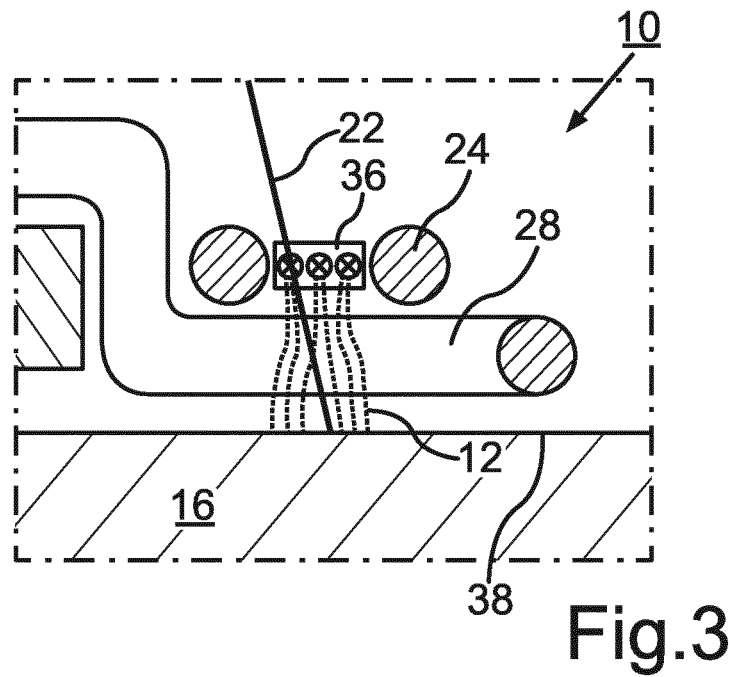
FIG. 3 an enlarged schematic illustration of a partial area of the device shown in a sectional view in FIG. 2.

FIG. 3 shows an enlarged schematic illustration of a partial area of the device 10 shown in a sectional view in FIG. 2. The suction and/or gas supply device 36 is illustrated as a suction device in the embodiment illustrated here, which sucks off process exhaust gases 12 arising during the generative manufacture of the component from a powder bed 38 of the component material. The powder bed 38 is applied to the component platform 16. The high-energy beam 22 is again oriented such that it can pass between the crossing area of the induction coils 24, 28 up to the powder bed 38 in the area of the construction and joining zone 20.

The embodiment of the device 10 illustrated in FIGS. 1 to 3 can additionally also include a control and/or regulating device and/or a temperature sensing device, wherein by the control and/or regulating device, the position and/or the power of the induction coil(s) 24, 28 are controllable and/or regulatable depending on the measurement results of the temperature sensing device.

The invention claimed is:

1. A device for generative production of at least one component area of a component of a flow machine, comprising:
    at least one lowerable component platform with at least one construction and joining zone for receiving at least one powder layer of a component material;
    at least one heating device movable relative to the component platform; and
    at least one radiation source for generating at least one high-energy beam, by means of which the powder layer can be locally melted and/or sintered to a component layer in the area of the construction and joining zone; and
    at least one suction and/or gas supply device which is mechanically connected to, and movable with, the heating device such that a working and operating area of the high-energy beam in the area of the construction and joining zone is in an operating area of the suction and/or gas supply device.

2. The device according to claim 1, wherein the device has at least one coater for applying the at least one powder layer of the component material to the construction and joining zone of the component platform, wherein the coater is movable relative to the component platform.

3. The device according to claim 2, wherein the heating device is movably or non-movably mechanically connected to the coater.

4. The device according to claim 1, wherein the device has at least one coater for applying the at least one powder layer of the component material to the construction and joining zone of the component platform, wherein the coater is movable relative to the component platform and wherein the heating device is movably or non-movably mechanically connected to the coater and wherein the coater includes at least one moving unit on which at least one heating device is disposed.

5. The device according to claim 1, wherein the heating device includes an induction coil.

6. The device according to claim 1, wherein the high-energy beam includes a laser or electron beam.

7. A device for generative production of at least one component area of a component of a flow machine, comprising:
   at least one coater for applying at least one powder layer of a component material to at least one construction and joining zone of at least one lowerable component platform, wherein the coater is movable relative to the component platform; and
   at least one radiation source for generating at least one high-energy beam, whereby the powder layer can be locally melted and/or sintered to a component layer in the area of the construction and joining zone; and
   at least one suction and/or gas supply device is mechanically connected to, and movable with, the coater such that a working and operating area of the high-energy beam in the area of the construction and joining zone is in an operating area of the suction and/or gas supply device.

8. The device according to claim 7, wherein at least one heating device is movably or non-movably mechanically connected to the coater.

9. The device according to claim 7, wherein the suction and/or gas supply device is disposed on the coater such that a working and operating area of the high-energy beam in the area of the construction and joining zone is in an operating area of the suction and/or gas supply device and wherein at least one heating device is movably or non-movably mechanically connected to the coater.

10. The device according to claim 9, wherein the coater includes at least one moving unit, on which at least one heating device is mechanically connected.

11. The device according to claim 7, wherein the heating device includes an induction coil.

12. The device according to claim 7, wherein the high-energy beam includes a laser or electron beam.

13. A method for generative production of at least one component area of a component of a flow machine, comprising the following steps:
   a) applying at least one powder layer of a component material to at least one construction and joining zone of at least one lowerable component platform;
   b) locally melting and/or sintering the component material in layers by supplying energy by at least one high-energy beam in the area of the construction and joining zone for forming a component layer;
   c) lowering the component platform in layers by a predefined layer thickness; and
   d) repeating the steps a) to c) until completion of the component area,
   wherein before and/or during and/or after exposure by the high-energy beam, deposits, splashes and/or process exhaust gases of the generative production process are removed from the construction and joining zone by at least one suction and/or gas supply device mechanically connected to, and movable with, a heating device such that a working and operating area of the high-energy beam in the area of the construction and joining zone is in an operating area of the suction and/or gas supply device, the heating device being movable relative to the component platform and/or on at least one coater movable relative to the component platform for applying the component material.

* * * * *